(12) United States Patent
Chao et al.

(10) Patent No.: US 7,817,836 B2
(45) Date of Patent: Oct. 19, 2010

(54) METHODS FOR VOLUMETRIC CONTOURING WITH EXPERT GUIDANCE

(75) Inventors: Hui-Min Chao, Houston, TX (US); David Chao, Houston, TX (US); Nicholas Chao, Houston, TX (US)

(73) Assignee: Varian Medical Systems, Inc., Palo Alto, CA (US)

( * ) Notice: Subject to any disclaimer, the term of this patent is extended or adjusted under 35 U.S.C. 154(b) by 1077 days.

(21) Appl. No.: 11/422,202

(22) Filed: Jun. 5, 2006

(65) Prior Publication Data

US 2007/0280521 A1 Dec. 6, 2007

(51) Int. Cl.
*G06K 9/00* (2006.01)
*A61B 6/00* (2006.01)
*A61B 8/00* (2006.01)

(52) U.S. Cl. .................... 382/131; 600/436; 600/437; 600/439

(58) Field of Classification Search .................. 382/100, 382/128–132; 128/916; 600/439, 443, 447, 600/462, 463, 471, 437, 1–3, 425; 378/21, 378/65
See application file for complete search history.

(56) References Cited

U.S. PATENT DOCUMENTS 7,438,685 B2 * 10/2008 Burdette et al. ............. 600/439
2003/0112922 A1 * 6/2003 Burdette et al. ............... 378/65

* cited by examiner

*Primary Examiner*—Samir A. Ahmed
*Assistant Examiner*—Mehdi Rashidian
(74) *Attorney, Agent, or Firm*—Lapus Greiner Lai Corsini, LLC; Theodore Lapus; Edwin Greiner

(57) ABSTRACT

An efficient method and system of contouring target volumes and normal tissues at risk using an expert case as interactive tutorial reference for radiation therapy treatment plan is disclosed. Target volume contours based on guidance from a disease-matched expert case is selected by the user. The second imaging data set of a new patient is then displayed and linked with expert's case in a the slice-by-slice and side-by-side fashion and at comparable field-of-view angles. Users can generate the target volume contours on the new patient using expert case as tutorial guidance or overlaying the expert contours onto the new patient's imaging data set followed by reforming the target volume contours to fit the anatomical terrain of the patient. Users can then modify the target volume contours of their patient using expert case as tutorial guidance linked in a the slice-by-slice and side-by-side fashion and at comparable field-of-view angles.

16 Claims, 2 Drawing Sheets

METHODS FOR VOLUMETRIC CONTOURING WITH EXPERT GUIDANCE

BACKGROUND OF THE INVENTION

1. Field of the Invention

The present invention generally relates to a method and system for contouring target volumes, more specifically relates to an efficient method and system for contouring target volumes and/or normal tissues at risk using an expert case as interactive tutorial reference for a radiation therapy treatment plan.

2. Description of the Related Art

Using a System for measuring myocardium in cardiac images is known. U.S. Pat. No. 5,669,382 to Curwen, et al. discloses a System for determining the epicardial boundary, being a closed curve dividing the myocardium from the tissue and blood surrounding the left ventricle. A mean and standard deviation is determined for pixels of a medical image of the subject's myocardial tissue. These are used to define a "goodness function" over the image which is positive for pixels statistically likely to be myocardial tissue, and negative for other pixels. An initial curve for modeling the epicardium in radial coordinates starts with a curve of inner myocardial boundary obtained my conventional imaging techniques. This curve is then iteratively updated to maximize the total "goodness function" of the region encompassed.

Using computerized software to modify developed treatment plan is known. U.S. Pat. No. 6,311,084 to Cormack, et al. discloses a computer based method and apparatus for providing prostate brachytherapy using Interventional Magnetic Resonance imaging is described. The invention utilizes the excellent soft tissue visualization that Interventional Magnetic Resonance provides to produce radiographic, geometric and dosimetric feedback to an implant treatment planner (software module). The feedback enables an iterative procedure for the placement of needles based upon cumulative dosimetric feedback on the effect of the current and prior needle placements. The invention allows a treatment plan to be developed and the implantation procedure to be performed initially in accordance with the developed treatment plan. Modifications to the plan are made in real-time by the invention software module coupled to the IMR imaging system. The implantation procedure continues with the modified plan where further modifications are made to the plan with placement of each subsequent needle. Calculation of final coverage is also provided for ending evaluation of the implant procedure.

Computer guided cryosurgery is known. U.S. Pat. No. 6,139,544 to Mikus, et al. discloses a system for assisting surgeons in performing cryosurgery of the prostate by calculating optimal positions for cryoprobes and providing display based templates for overlay over an ultrasound image display, and displaying actual cryoprobe ultrasound images together with template images so that the surgeon may compare suggested and actual placement of the cryoprobes, and adjust placement accordingly.

Computing contours in medical imaging system is known. U.S. Pat. No. 6,249,594 to Hibbard discloses a system and method is disclosed for automatically computing contours representing the boundaries of objects in three-dimensional tomographic images that may be formed by computed tomography ("CT"), magnetic resonance imaging ("MRI"), positron emission tomography ("PET"), single proton emission computed tomography ("SPECT"), or other appropriate methods. The system and method begin with a sample region of the object's interior and the single region is expanded in a step-wise fashion. At each step, a contour maximally matching the region's current edge, local gray-level gradient maxima, and prior contour shapes is determined. Upon completion of region expansion, the object contour is set to that step-contour having the maximum value of an objective function summing contributions from region edges, gradient edges, and prior shapes. Both the region expansion and the boundary contour determination are formulated such that there is a guaranteed average minimum error in the determination of the contours. This contour is represented as a parametric curve in which the contour size and shape are specified by the values of the parameters. These parameters are independent variables of the objective function. The parameters also are considered to be random variables capable of encoding a distribution of contour shapes, and by assuming a particular distribution, the contribution of shape constraints to the object function can be computed. The resulting contour corresponds to the set of parameters for which the objective function is a maximum.

Often in the course of clinical testament or diagnosis, a patient's internal anatomy is imaged for determining the extent to which disease has progressed. The diseased tissue may be evidenced by some variance from normal anatomy or function. Several imaging models are commonly used to generate images of the patient's anatomy and function for diagnostic and radiotherapy treatment purposes or surgical planning. These models include conventional X-ray plane film radiography; computed tomography ("CT") imaging, magnetic resonance imaging ("MRI"); and nuclear medicine imaging techniques, such as positron emission tomography ("PET") and single photon emission computed tomography ("SPECT").

A common property shared by all the imaging models just mentioned is that all images are digitalized in that the images are represented as a set of numerical values representing a physical measurement. If these images are two-dimensional ("2-D"), the discrete picture elements are called pixels. However, if the images are three-dimensional ("3-D"), the discrete volume elements are referred to as voxels. For 3-D imaging models, single slices or sections are composed of pixels, but those same picture elements are equivalently termed voxels in a 3-D sense. The digital images from 2-D or 3-D imaging models are substantially exact maps of the pictured anatomy, so that each pixel value represents a sample of a property at a location in patient's coordinate system. Thus, the distances between pixel/voxel centers are proportional and have meaning in the sense of real physical spacing in the patient anatomy.

The numeric value of each pixel represents a sample of a property at that location. In CT images, for example, the numbers are a measure of relative X-ray absorbing power, e.g. spaces inside the lungs are usually pictured as dark (low CT number) while bone is generally bright (high CT number).

Alternatively, in the 2-D context of a slice or section, anatomy elements may be represented by 2-D templates identical in size and shape to the object 2-D templates are patterns of pixels all having the same value which represent a single region in an image. A representation by 2-D region-templates or by 2-D edge-contours are equivalent, since either representation can be readily computed from the other.

As can be seen, 3-D reconstructions of patient anatomy are most often prepared using computer graphics by manually drawing the individual contours on a contiguous set 2-D image slices or sections and then combining them. This method is referred to as contouring.

Contouring is very time-consuming and labor intensive. The time and labor necessary to use this method increases significantly with the number of image slices, and the number and sizes of the organs, tumors, etc. in the anatomical area of interest. The quality of the contouring and the later produced 3-D images, depend on the resolution and contrast of the 2-D images, and on the knowledge and judgment of the physician, scientist, or skilled professional performing the reconstruction.

Three-dimensional radiation therapy treatment planning ("RTTP") is a medical procedure that currently makes the greatest use of 3-D reconstructions. This is even despite the labor and time required to contour the organs and tumors to generate a useful plan. In fact, the largest fraction of the plan preparation time involves contouring.

Another method that may be used for forming representations of organs, tumors, and the like is the segmentation method. Segmentation is the identification of image objects as distinct regions or segments of an image. This method also may be used to generate 3-D reconstructions of a patient's anatomy. A number of autosegmentation methods have been proposed in the prior art. These prior art methods may be separated into two principal types: (1) semi-automated segmentation methods in which physicians, technicians, or skilled professionals direct or provide some needed information which is used to produce detailed contours, and (2) fully automated segmentation methods in which a computer based program develops the segmentation without requiring any human intervention. These methods will be described in greater detail subsequently.

Fully automated, computed segmentation has been reported only for limited anatomic locations and/or narrowly-defined imaging protocols. In fully automated, computed segmentation system, an imaging modality is used to produce the original images. Models such as MRI are preferred because they produce images of soft tissue and display neighboring organs at higher contrast than X-ray based imaging. Further, MRI scanners can be set to produce images emphasizing proton density or different relaxation phenomena. Further, multi-modal MRI, in principle, can provide more information for each voxel.

The few fully automated, computed segmentation techniques is typically directed to the segmentation of the brain gray matter, white matter, and cerebrospinal fluid ("CSF") spaces using multi-modality MRI. These approaches use statistical pattern recognition methods to distinguish the various materials.

A different strategy for fully automated, computed segmentation is to map a labeled atlas onto patient data by non-linear transformations, referred to as warping. This technique will produce local correspondences between the atlas and individual patient anatomies despite inter-subject anatomic differences. Typically, a procedure in which an elastic model of the brain anatomy is driven by data-overlap probabilities to warp brain atlas images onto MRI slice or section images is provided. Segmentation occurs by associating the image voxels with atlas tissue-type labels.

Therefore, to improve the quality of contouring results, there is need for a method and system that allows users to contour a set of target volume contours based on guidance from a disease-matched expert case.

SUMMARY OF THE INVENTION

The present invention generally relates to an efficient method and system for contouring target volumes and/or normal tissues at risk using an expert case as interactive tutorial reference for a radiation therapy treatment plan. The present invention provides a method and system for selecting a set of target volume contours based on guidance from a disease-matched expert case.

To allow a user to select a set of target volume contours based on guidance from a known disease-matched expert case.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
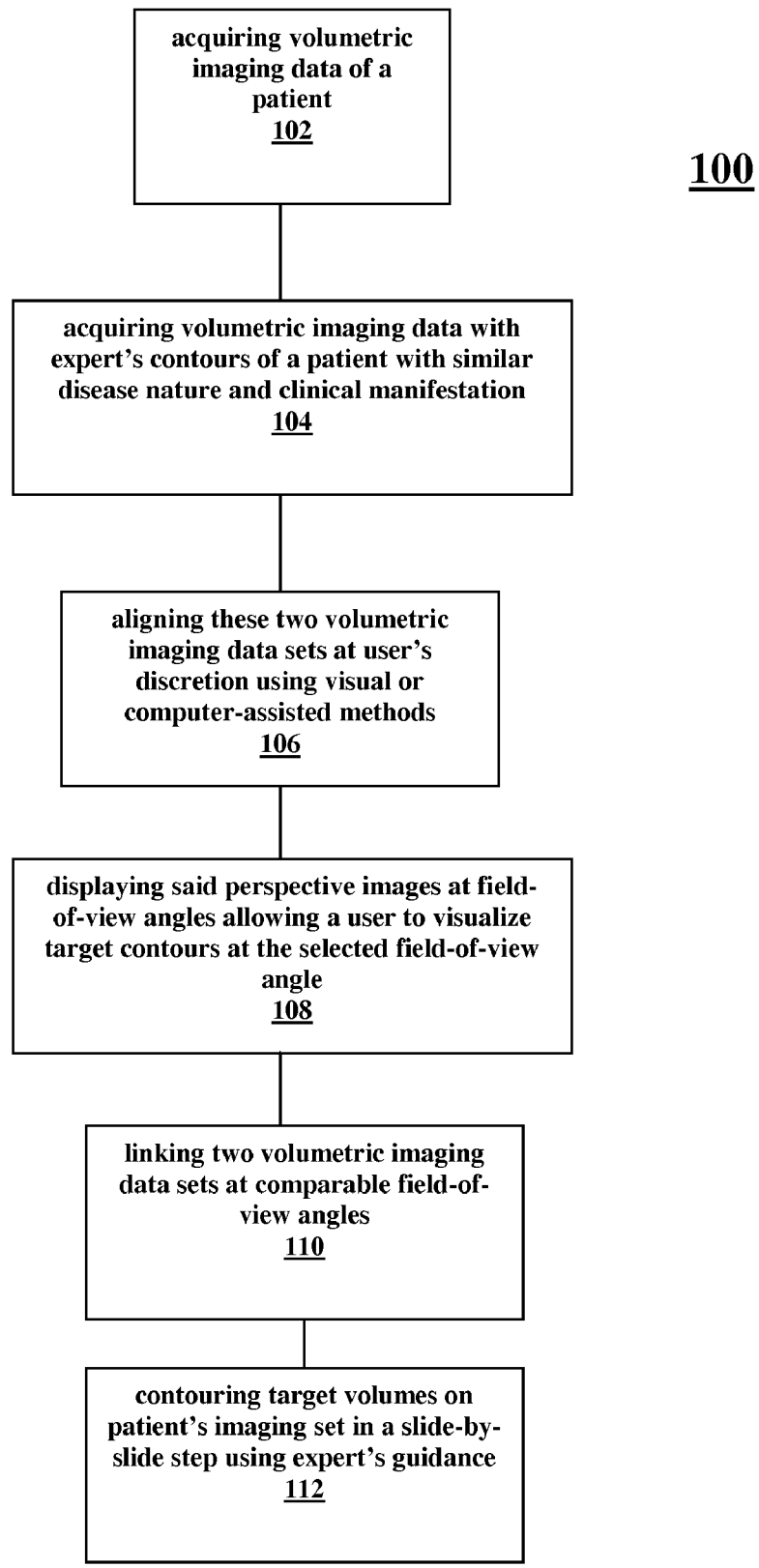
FIG. 1 is a flowchart of the present invention.

Before describing in detail embodiments that are in accordance with the present invention, it should be observed that the embodiments reside primarily in combinations of method steps and apparatus components related to the selection of a set of target volume contours based on guidance from a disease-matched expert case. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of a method relating to the selection of a set of target volume contours based on guidance from a disease-matched expert case described herein. The non-processor circuits may include, but are not limited to, a radio receiver, a radio transmitter, signal drivers, clock circuits, power source circuits, and user input devices. As such, these functions may be interpreted as steps of a method to perform functions relating to the selection of a set of target volume contours based on guidance from a disease-matched expert case. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

An efficient method and system of contouring target volumes and normal tissues at risk using an expert case such as interactive tutorial reference for radiation therapy treatment plan is provided herein. Target volume contours based on guidance from a disease-matched expert case are selected by a user. An imaging data set of a new patient is first displayed and then linked with the expert's case in a slice-by-slice and side-by-side fashion and compared at a set of comparable field-of-view angles.

The user can generate the target volume contours on the new patient using an expert case as tutorial guidance, or alternatively overlaying the expert contours onto the new patient's imaging data set. Afterwards, the target volume contours may be reformed to fit the anatomical terrain of the specific patient. The user can then modify the target volume contours of the patient using the expert case as tutorial guidance linked in a slice-by-slice and side-by-side fashion and at comparable field-of-view angles.

Referring to FIG. 1, a flowchart 100 depicting a method for facilitating target volume contouring for conformal radiation therapy planning using interactive expert guidance is shown. A patient's volumetric imaging data are acquired (Step 102). The volumetric imaging data with expert's contours of a patient with similar disease nature and clinical manifestation is provided and acquired (Step 104). The expert volumetric imaging data set may include tumor and/or normal tissue contours from a disease-matched expert case. The imaging data may comprise computer tomography, magnetic resonance imaging, or positron emission tomography. Under control of the user, these two volumetric imaging data sets of Steps 102 and 104 are aligned using either visual or computer-assisted methods (Step 106). A displaying is provided for displaying the images such as perspective images at field-of-view angles such that viewers can visualize target contours in at least one selected field-of-view angle (Step 108). The two volumetric imaging data sets are then linked at comparable field-of-view angles (Step 110). The linking may be achieved by various means including using a computer program or manually. Furthermore, the linking may be achieved via comparable field-of-view angles, including axial, sagittal, and coronal view angles. One of the actions performed in displaying and linking perspective images is, based on reforming the target volume contours from expert case, fit the corresponding anatomical configuration of a new patient's imaging data. The fitting action includes reforming target volume comprises aligning two imaging sets to an approximate orientation by user-controlled tools at axial, sagittal, and coronal view angles. This fitting action may be achieved using a computation process that is either automatic (computerized) or manual. Using the expert data, contouring target volumes on patient's imaging set may be achieved in a slice-by-slice and side-by-side step using expert's guidance in contouring a new patient's imaging data set at user's discretion with or without expert's contour overlay (Step 112). The contours of the patient's image or picture may further be adjusted in the slice-by-slice and side-by-side fashion using the expert's data as a guidance in modifying contours after overlaying and/or reforming expert's contours onto a new patient's imaging data set. In other words, contouring target volumes on patient's imaging set is achieved in a slice-by-slice and side-by-side fashion (Step 112) using expert's data as a guidance.

The present invention forms a new patient's graphic data or picture by comparing with an expert's graphic data in a the slice-by-slice and side-by-side fashion in that relevant data of each data set are compared. By way of an example, a set of CT images contains multiple slices at 3 to 5 mm slice intervals. The present invention teaches how a user can scroll thru slices and pick and choose the slice corresponding to the expert's case and link them in a slice-by-slice fashion before making further changes based on guidance from expert's images.

Figure 2:
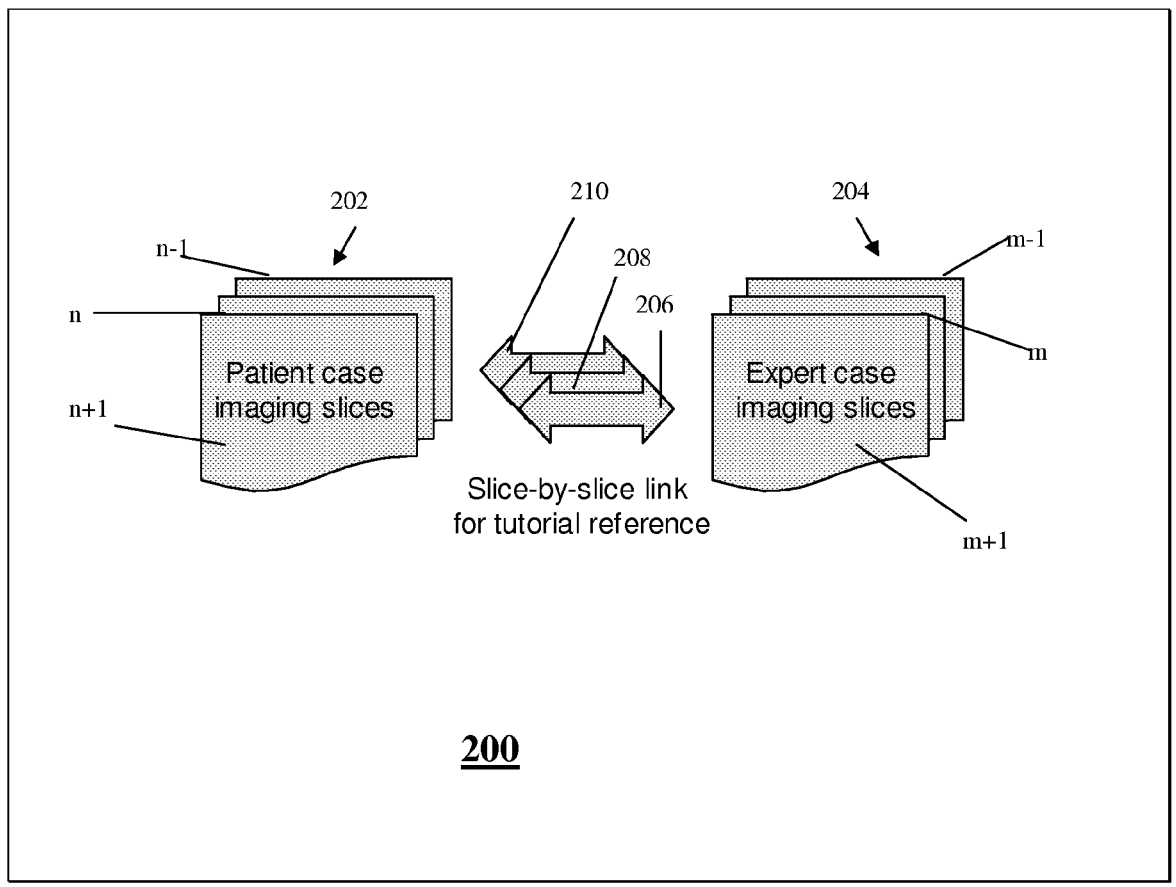
FIG. 2 is a block diagram of the present invention.

Referring to FIG. 2, a block diagram 200 of the present invention is shown. A patient case imaging data 202 is sliced into a number of slices corresponding to the slices of an expert case imaging data 204. The slices of an expert case imaging data 204 are used on a slice-by-slice basis for tutorial references. In other words, slice n+1 of patient case imaging data 202 links and corresponds to 206 slice m+1 expert case imaging data 204. Slice n of patient case imaging data 202 links and corresponds to 208 slice m expert case imaging data 204. Slice n−1 of patient case imaging data 202 links and corresponds to 210 slice m−1 expert case imaging data 204. It should be noted that m and n are both natural numbers and that n may equal to m (n=m) or otherwise.

A method for facilitating target volume contouring for conformal radiation therapy planning using interactive expert guidance is provided. The method includes: acquiring volumetric imaging data of a patient; acquiring volumetric imaging data with expert's contours of a patient with similar disease nature and clinical manifestation; aligning these two volumetric imaging data sets at user's discretion using visual or computer-assisted methods; displaying said perspective images at field-of-view angles allowing the person to visualize target contours at the selected field-of-view angle; linking two volumetric imaging data sets at comparable field-of-view angles; and contouring target volumes on patient's imaging set in a slice-by-slice step using expert's guidance.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for facilitating target volume contouring in conformal radiation therapy planning using interactive expert guidance, comprising providing a first patient's volumetric imaging data;

providing expert's volumetric imaging data derived from a group of second patients with expert's contours of the group of second patients having similar disease nature or clinical manifestation; and contouring target volumes on first patient's imaging set in a slice-by-slice step using expert's guidance with the guidance derived from the second group of patients.

2. The method of claim 1 further comprising aligning said patient's and expert's volumetric imaging data sets at an user's discretion using visual or computer-assisted methods.

3. The method of claim 1 further comprising displaying perspective images of said imaging data at field-of-view angles such that to allow a person to visualize target contours at the selected field-of-view angle.

4. The method claim 3, wherein the step of displaying perspective images is based on reforming said contoured target volume from expert case to fit the corresponding anatomical configuration of said patient's imaging data.

5. The method claim 4, wherein said reformed target volume comprises aligning two imaging sets to an approximate orientation by user-controlled tools at axial, sagittal, or coronal view angles.

6. The method claim 5 further comprises reformation computation process.

7. The method of claim 1 further comprising linking two volumetric imaging data sets at comparable field-of-view angles.

8. The method of claim 7, wherein the step of linking two volumetric imaging data sets uses a computer program product.

9. The method of claim 7, wherein said comparable field-of-view angles include axial, sagittal, and coronal view angles.

10. The method claim 7, wherein the step of linking perspective images is based on reforming the target volume contours from said expert case to fit the corresponding anatomical configuration of said patient imaging data.

11. The method claim 10, wherein said reformed target volume comprises aligning two imaging sets to an approximate orientation by user-controlled tools at axial, sagittal, or coronal view angles.

12. The method claim 11 further comprises reformation computation process.

13. The method of claim 1, wherein said imaging data are data associated with computer tomography, magnetic resonance imaging, or positron emission tomography.

14. The method of claim 1, wherein said expert guidance is achieved using a volumetric imaging data set containing tumor and normal tissue contours from a disease-matched expert case.

15. The method claim 1, wherein the step of contouring target volumes uses said expert's guidance comprises contouring said patient's imaging data set at user's discretion without expert's contour overlay.

16. The method claim 1, wherein the step of contouring target volumes comprises modifying contours after overlaying and reforming said expert's contours onto said patient's imaging data set.

* * * * *